May 1, 1934.  M. BONNET  1,957,196
COUPLING MECHANISM
Filed July 18, 1932   2 Sheets-Sheet 1

Inventor:
Maurice Bonnet
By Louis Barnett
Attorney

May 1, 1934.  M. BONNET  1,957,196

COUPLING MECHANISM

Filed July 18, 1932  2 Sheets-Sheet 2

Inventor:
Maurice Bonnet
By Louis Barnett
Attorney

Patented May 1, 1934

1,957,196

UNITED STATES PATENT OFFICE 1,957,196

COUPLING MECHANISM

Maurice Bonnet, Paris, France

Application July 18, 1932, Serial No. 623,231
In Luxemburg July 25, 1931

3 Claims. (Cl. 74—54)

This invention relates to a coupling mechanism between two parts in motion and can be used, in general, as a device for transmitting movement from one of the parts to the other part, by allowing the variation of one or more characteristics of the said movement for obtaining a movement having definite characteristics. The invention has for its object to provide such a mechanism which can be used as change speed gear, as movement transforming device, etc., which mechanism is of very high mechanical efficiency, and silent and reliable in operation.

Another object of the invention consists, in addition to providing the mechanism under consideration with two main parts, either of which can be a driving or a driven part, in constructing the said two main parts in such a way that:

On the one hand, one of the said parts is composed of one or more systems of rigid means, of the same length, pivotally connected to the said part so that their pivotal points be distributed on a circumference or on circumferences, which means can move about their pivot in one or more planes parallel to each other;

On the other hand, the other of these parts is composed of one or more bearing and sliding tracks for the free ends of the above mentioned means, which bearing and sliding tracks are of suitable shape, particularly circumferential, and such that they are contained in planes preferably parallel to each other, which planes mingle with the planes of movement of the means corresponding thereto, these bearing and sliding tracks being capable of describing any movement or movements relatively to the first part above mentioned, but such that the rigid means above mentioned constantly remain in contact by their free end with their corresponding bearing and sliding track.

The invention further consists, in case it is desired to use the above mentioned mechanism as automatic change speed gear, in associating therewith a secondary mechanism, constituted by means allowing to automatically ensure the eccentric positioning of one of the parts relatively to the other, which eccentric positioning is controlled by a resilient means suitably calibrated.

The invention will be easily understood from the complementary description given hereinafter and from the accompanying drawings, which complementary description and drawings are given only by way of indication.

Fig. 1 is a diagrammatic axial longitudinal section of a change speed gear having a fixed ratio of variation, constructed according to a first form of carrying out the invention.

Figs. 2, 3 and 4 are diagrammatic cross sections made according to lines 2—2, 3—3 and 4—4 of Fig. 1, respectively, showing the change speed gear having a fixed ratio of variation, constructed according to the first form of carrying out the invention.

Figure 1:
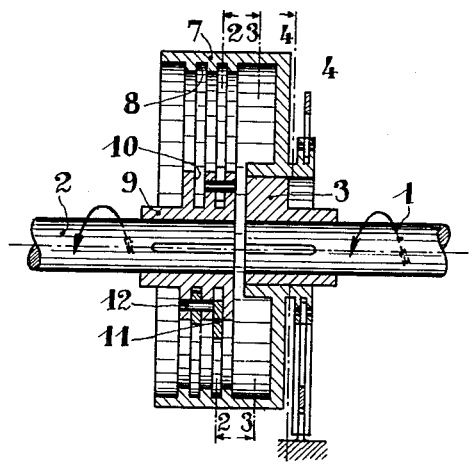
Figure 4:
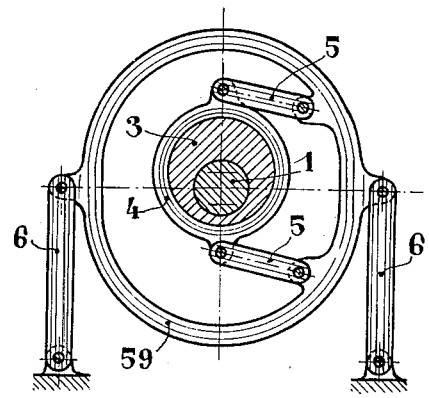
Figure 2:
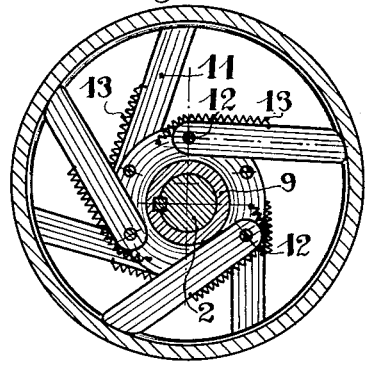
Figure 3:
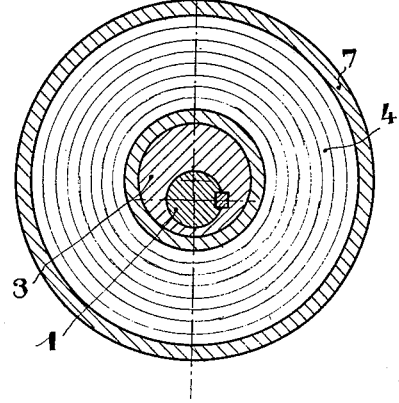
Figure 5:
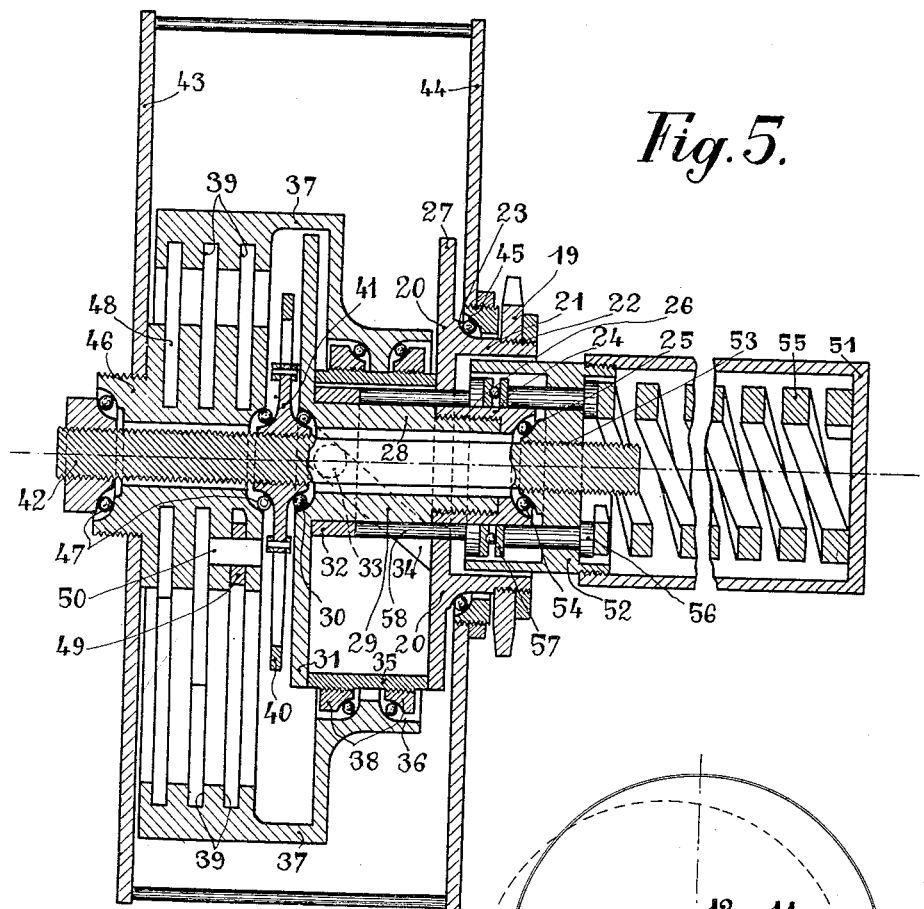
Fig. 5 is a diagrammatic axial longitudinal section of a change speed gear having an automatically variable ratio of variation and made according to the invention.

Assuming for instance two shafts, one, the shaft 1 which is the driving shaft and rotating at a certain speed, and the other, the shaft 2 which is the driven shaft, and that it is desired to arrange between both shafts a change speed gear of the type under consideration, according to the invention the said mechanism is constructed as follows:

On the driving shaft 1 is mounted an eccentric 3 rotating with the said driving shaft 1. A flywheel 4 is mounted on the eccentric 3, but does not rotate with it, a system of four connecting rods, two of which, 5, are secured to the flywheel, and the two others, 6, to fixed parts, allows it to effect any movements caused by the rotation of the eccentric, but prevents it from rotating. The inner periphery of the rim 7 of the said flywheel 4 is provided with two grooves 8 which constitute bearing and sliding tracks.

On the shaft 2, which is the driven shaft, is mounted a kind of sleeve 9 rotating with the said shaft and having two grooves 10 in each of which are arranged the ends of three connecting rods 11 which are pivotally connected to the said sleeve 9 by means of joint pins 12. The free ends of the said links 11 fit into the grooves 8 of the flywheel 4, and press on the bottom of the said grooves under the action of small returning springs 13.

The operation of such a mechanism is as follows: the driving shaft 1 rotating in the direction of the arrow, the eccentric 3 is caused to rotate, the flywheel 4, under the action of the said eccentric 3, moves in such a manner that it does not rotate, but that its center describes a circumference equal to that described by the center of the eccentric 3. For each definite position of the eccentric 3 corresponds a definite position of each link 11, but according to the position of their joint pin 12 relatively to the center of the eccentric, the said links 11 are differently inclined relatively to the inner surface of the grooves 8 in the flywheel 4. Assuming the driving shaft 1 and the eccentric 3 are rotating, and, consequently, that the flywheel 4 moves as indicated above, the free ends of the links 11 are all positively in contact with the bearing track corresponding thereto, but at a given moment, the said bearing tracks of the flywheel 4 which is in motion do not react in the same way on all the links 11. In fact, all the points of the bearing tracks move at the same speed by describing identical circumferences, the free end of any link 11 urged only by its bearing track will therefore acquire a speed which can be graphically represented by a vector 14 tangent to the trajectory circumference 15 of the free end of the link 11. The pivoted end of the same link 11 moves in its turn, by rotating about the axis of the driven shaft 2, its speed can therefore also be represented by a vector tangent to the trajectory circumference 17 of the joint pin of the link 11.

It is to be noted that, except when the link under consideration is in such a position that the pivot of the said link 11 is located in the plane passing through the axis of the eccentric 3 and the axis of the driving shaft 2, the two speed-vectors 14 and 16 are not parallel and of the same direction at the same time, the link 11 pivoting about its pivot 12 at the same time as the latter describes the trajectory circumference 17, the speed of rotation of this link 11 about its axis of rotation being represented by the vector 18 joining the end of the two other vectors $14^1$ and 16 (the vector $14^1$ being parallel and equal to the vector 14).

As each link 11, for a complete revolution of the eccentric 3, passes only once through this position in which the speed vectors 14 and 16 are parallel and of the same direction, after having been spaced therefrom to the maximum, and having moved towards it and reached it for again moving away therefrom, it results therefrom that the said speed-vectors above mentioned occupy relatively to each other different positions from those in which they are parallel and of the same direction, to those in which they are parallel and of opposite directions, for finally returning to the first position, and therefore that the speed of the joint pin of the link (which speed alone is useful and collected) reaches a maximum, then a minimum by passing through a sequence of intermediate values. The flywheel 9 of the driven shaft having 6 links, it is obvious that it will be moved at every instant by the link, the joint pin of which rotates at the highest speed, each of the 6 links successively occupying the positions in which the speed of its end carrying the joint pin is maximum, each of the links will act in turn as driving link.

The curve representing the speed of the driven shaft 2 will therefore be constituted by the succession of portions of sinusoids (sinusoids representing the speed of the free ends of the links 11) which portions of sinusoids are chosen at the place where they are most identical to a straight line.

The change of link takes place when the center of the eccentric 3 is located on the bisector of the angle formed by the radii joining the center of the driven shaft 2 to the joint pins of the links 11 under consideration, that is to say when the free ends of the links 11 have the same speed, but one having an increasing speed, the other a decreasing speed.

If $r$ designates the radius of eccentricity and R the distance from the joint pin 12 of the links 11 to the axis of the shaft 2, the ratio of the speed of the driven shaft 2 to the speed of rotation of the driving shaft 1, will be equal to $$\frac{r}{R}.$$

Figure 6:
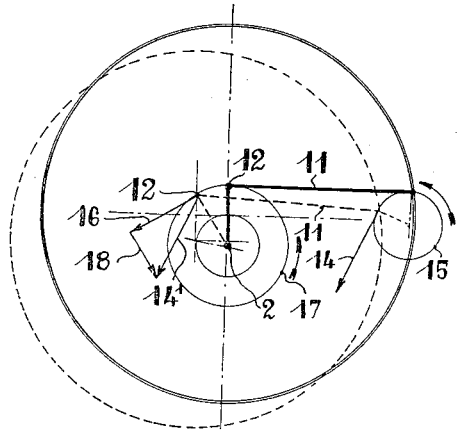
Fig. 6 is a diagrammatic view of a connecting rod and of a bearing track in two different positions, with the speeds of definite points represented by vectors.

In fact, referring to Fig. 6 (diagrammatically illustrating by simple lines a link with its bearing track in two different positions), it will be understood that, when the free end of this link 11 describes the circumference it can describe under the action of the eccentric 3 controlling the bearing track, when the shaft has effected a revolution equal to $2\pi r$, the pivoted end of the said link 11 which cannot rotate about the axis of the shaft 2 will move on a circumference having a radius R, according to a length approximately equal to $2\pi r$; consequently, for one revolution of the driving shaft 1, $$\frac{2\pi r}{2\pi R}=\frac{r}{R}$$

revolutions of the driven shaft 2 will approximately be obtained, this clearly showing that the reduction ratio is approximately $$\frac{r}{R}.$$

It is to be noted that the driving shaft 1 might rotate in a direction opposite to that indicated, whilst imparting a movement of rotation to the driven shaft 2, in the same direction as previously. In this case, it is the lower links 11 which operate. The sliding movement is more important owing to the greater obliquity of the operating links relatively to their bearing track.

Assuming now that the invention is to be applied to a bicycle for instance, by providing an automatic change speed gear for driving the rear wheel, this automatic change speed gear devised according to the invention, will be of the following construction:

The toothed pinion 19 receiving the chain which transmits to it the stress exerted on the pedal gear, is fixedly mounted on a member 20 composed:

(a) of an outer hub 21 having a screw-threaded portion 22 and a ball bearing raceway 23, (b) of an inner hub 24 having a ball bearing raceway 25 and an inner screw-thread 26, (c) of a cheek member 27 connecting both hubs 21 and 24.

This member 20 is screwed on a member 28 having a hub 29 provided with a ball bearing raceway 30 and a cheek member 31.

A kind of ring 32 is mounted on the hub 29 of the member 28 and can slide along this hub 29. This ring 32 is provided on its outer surface with two projections 33 movable in two grooves 34 formed in the inner recess of a kind of ring 35, on the outer surface of which two ball bearing raceways 36 are screwed.

The grooves 34 of the ring 35 are inclined at 45° relatively to the plane of its faces and are such that, the projections 33 of the ring 32 being in engagement with these grooves 34 and the ring abutting against the cheek 27 of the member 20, the axis of the ring 32 is mingled with the axis of the ball bearings of the ring 35, and that, when the ring 32 abuts against the cheek 31 of the member 38, the axis of the ring 32 is displaced to the required extent relatively to the axis of the ball bearings of the ring 35.

A kind of flywheel 37 internally provided with:
(1) ball bearing raceways 38 corresponding to those mounted on the ring 35,
(2) circumferential bearing tracks 39, is mounted, through the medium of ball bearings, on the ring 35. A system of four links, two of which have one of their ends pivotally connected to the said flywheel 37, and the other on a kind of frame 40 of oval shape, and the two others have one end pivotally connected to a member 41 screwed on the fixed spindle 42 of the rear wheel of the bicycle, and the other to the same frame 40 of oval shape, allows the flywheel 37 to move so that its center may occupy any point within the circle bounded by the circumference described by the center of the ring 35 when its eccentricity is maximum. The hub of the wheel on which are secured the spokes constituting the wheel, is provided with two braced cheeks 43 and 44, one of them, the cheek 44, has a ball bearing raceway 45 corresponding to that mounted on the member 20; the other cheek is mounted on a kind of roller 46, mounted in its turn on the fixed spindle 42 of the rear wheel of the bicycle, through the medium of two ball bearings 47. This roller is provided with a plurality of circular grooves 48 in which extend the ends of nine small links 49, three links per groove, which links 49 are pivotally connected to the said roller 46 by means of pins 50. The other end of each of the said links 49 bears upon the corresponding bearing tracks 39 of the flywheel 37; a small returning spring constantly tends to hold the free end of the said links 49 against their respective bearing track 39.

A casing 51, secured on a kind of plug 52 having an inner screw-thread 53 allowing to secure it on the fixed spindle 42 of the rear wheel of the bicycle, and a ball bearing raceway 54, contains a coil spring 55 constantly bearing, through the medium of push pieces 56, of a thrust bearing 57 and of other push pieces 58, upon the ring 32.

The operation of such a device is as follows:
The stress exerted on the pedal gear is transmitted, through the chain, to the toothed pinion 19, which drives both members 20 and 28 rotating about the fixed spindle 42 of the rear wheel.

The spring 55, acting on the push pieces 56 and 58, exerts a constant thrust on the ring 32 which is pressed against the cheek 31 of the member 28, so that it may have the maximum eccentricity.

The maximum eccentricity which can be assumed by the ring 35 relatively to the fixed spindle 42 being determined in order that the wheel may rotate at a maximum speed relatively to the toothed pinion 19 for this maximum eccentricity, and in such a way that this maximum speed will practically never be reached, the wheel will rotate at a lower speed but approximating the possible maximum value of the stress to be overcome is very small.

If, from any cause whatever, the resistance increases, when going uphill for instance, the reactions of the links 49 on the bearing tracks 39 will tend to restore the ring 32 to a position of small eccentricity, this being capable of taking place only by causing the said ring 32 to move along the hub 29 of the member 28, in opposition to the action of the spring 55. At a given moment, an equilibrium will take place between the reactions of the links 49, tending to center the ring 32, and the spring 55 tending to put it out of center, the apparatus will operate for a definite radius of eccentricity suited to the resistance to be overcome, and the change of speed will take place as explained above.

This mechanism therefore truly acts as an automatic change speed gear, and, moreover, it conveniently allows free wheel running; in fact, when going downhill, the wheel rotates more rapidly than it would rotate under the action of the pedal gear and of the flywheel 37, the links 49 driven by their pin 50 rotate in the flywheel by sliding on their bearing track 39 and do not offer any resistance.

The maximum speed permitted by the maximum eccentricity is conveniently chosen outside the maximum limits which can practically be reached, so that the automatic change speed gear may constantly operate.

The invention is not limited in any way to the applications and forms of construction more particularly indicated herein, it includes on the contrary all modifications.

What I claim as my invention and desire to secure by Letters Patent is:—

1. In a device of the class described, a driving member, a driven member, an eccentric carried by the driving member, means for converting the rotary movement of the eccentric into movement of translation and for reconverting said movement of translation into rotary movement of the driven member, said means comprising a longitudinally movable ring having projections engaging the eccentric internally for changing the eccentricity according to the torque and means opposing such change of eccentricity.

2. In a device of the class described, a driving member, a driven member, an eccentric having grooves and carried by the driving member, a crown mounted to be translated by the eccentric, means operative to transmit movement from the crown to the driven member, means for varying the eccentricity according to the torque, comprising a longitudinally adjustable ring having projections engaging in the grooves in the eccentric and means tending to counteract changes in the eccentric varying means.

3. In a device of the class described, an axle, driving and driven members mounted on the axle, an eccentric carried by the driving member, a crown mounted for translation on the eccentric, means operative to transmit movement from the crown to the driven member, means for varying the eccentricity according to the torque comprising a ring mounted within the eccentric and adapted to be translated axially with respect thereto and means tending to prevent variation of the eccentricity comprising spring pressed pins engaging the ring.

MAURICE BONNET.